United States Patent Office 2,964,961
Patented Dec. 20, 1960

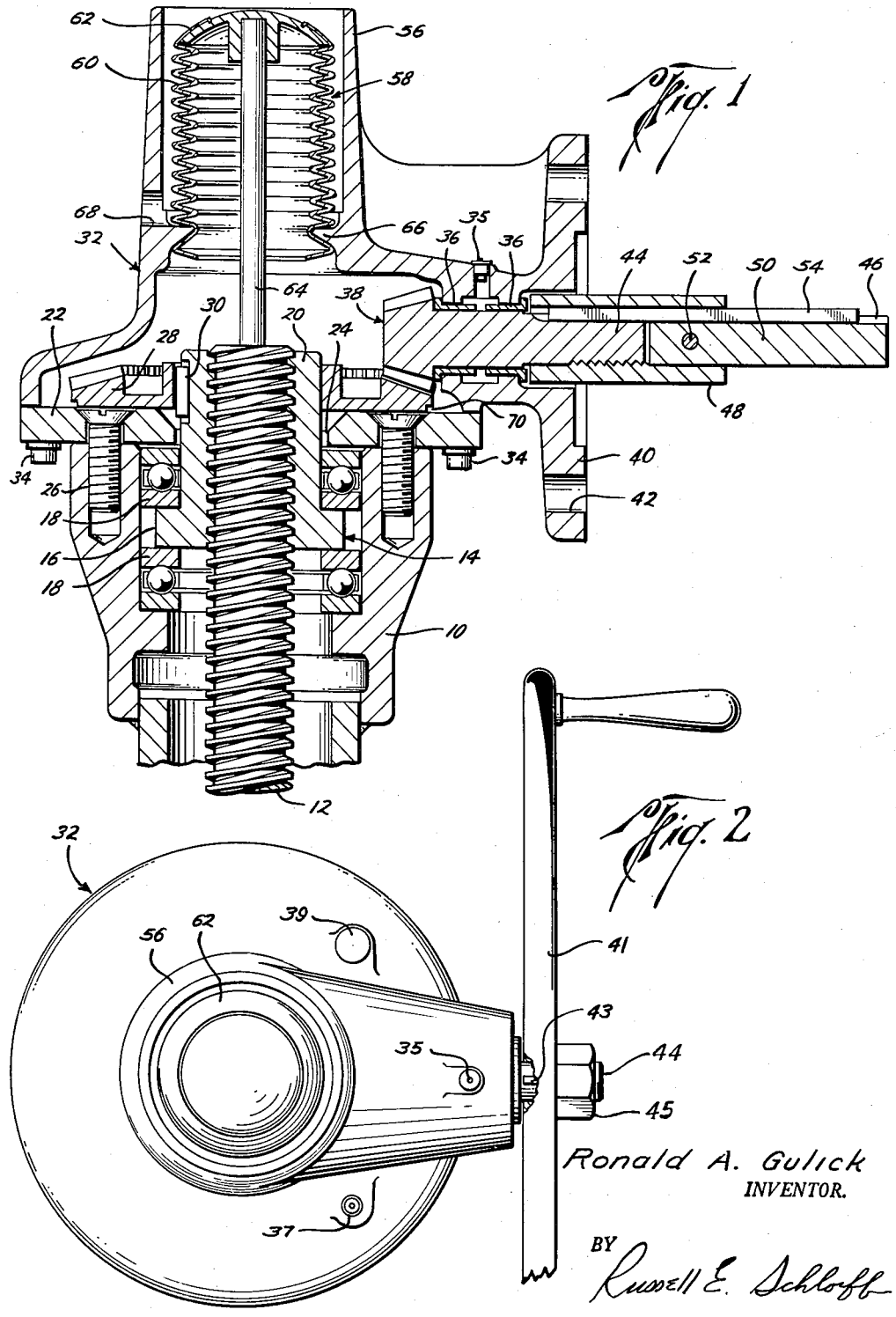

2,964,961

BEVEL GEAR OPERATOR

Ronald A. Gulick, Houston, Tex., assignor to ACF Industries Incorporated, New York, N.Y., a corporation of New Jersey Filed June 11, 1959, Ser. No. 819,580

12 Claims. (Cl. 74—423)

This invention relates to valves and more particularly to an improved bevel gear operator.

In rising stem valves, the stem is threadingly engaged with a stem nut which is mounted in the bonnet part of the valve. As the stem nut is revolved, the stem which is nonrotative raises and lowers opening and closing the valve. In smaller size valves, a handwheel may be keyed to the stem nut to apply the rotative movement. In larger size valves, it is desirable to utilize the benefits of the mechanical advantage of a bevel gear operator. An electric motor or handwheel can be attached to the pinion gear of the operator to supply the rotative movement. A main object of the present invention is directed to providing an improved bevel gear operator of simple, rugged construction which is easy to manufacture and is easy to assemble onto the valve.

Generally speaking, the bevel gear operator of the present invention has a bottom plate which is attached to the bonnet of the valve. A bevel gear is keyed to the stem nut of the valve to prevent relative rotative movement. The bevel gear is supported by the bottom plate and is not held down or supported by the stem nut. A housing is attached to the bottom plate. A pinion is mounted in the housing and is in meshing engagement with the bevel gear. Means extending from the pinion attach the operator to a handwheel or electric motor operator. By having the pinion mounted in the housing, the housing can be removed from the valve while the valve is on the line and the pinion can be taken out and repaired. Also, the bevel gear itself can be removed. It is an object to provide a bevel gear operator which can be overhauled while the valve is on flow. The bevel gear operator also is provided with a stem protector and indicator.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purpose of illustration and description and are shown in the accompanying drawings, forming a pair of the specification, wherein:

Fig. 1 is a fragmentary central vertical section of a valve incorporating the bevel gear operator of the present invention.

Fig. 2 is a top view of the operator shown in Fig. 1 adapted for handwheel operation.

Referring now more particularly to the drawings, only the upper portion of the valve body or bonnet 10 is shown. The remaining portion of the valve body together with the valve seats and the closure member secured to the lower end of valve form no part of the present invention, it may take any number of forms. For example, the form shown in copending United States application 693,399 filed October 31, 1957.

Extending upward through the bonnet 10 is a valve stem 12 which operates the valve member. The valve stem 12 is nonrotative and operates the valve member by reciprocatory movement. The valve stem 12 is threadedly engaged with a stem nut 14 which is mounted in the upper section of the bonnet 10. Rotation of the stem nut 14 causes the nonrotative stem 12 to extend and retract, depending on the direction of rotation. The stem nut 14 is formed with a flange 16 mounted between thrust bearings 18, 18 which absorb the opening and closing thrust, and a cylindrical section 20 which extends above the top of the bonnet 10. As is well known in the art, the operator can be used with a non-rising stem valve as well as with the rising stem type shown. In such case, the stem 12 and stem nut 14 will not have any relative rotative movement and the stem will rotate as the stem nut rotates.

A bottom mounting plate 22 forms the base of the bevel gear operator. The plate 22 is circular and is provided with a centrally located opening 24 which telescopes over the cylindrical section 20 of the stem nut 14. The bottom plate 22 is attached to the top of the bonnet by means of countersunk cap screws 26. A bevel gear 28 is telescoped over the cylindrical section 20 of the stem nut 14. The cylindrical section 20 and the inside hub of the bevel gear 28 are provided with mating keyway slots. A key 30 cooperating with the mating keyway slots fixes the bevel gear 28 and stem nut 14 against relative rotation; however, axial movement of the bevel gear is permitted since the keyway slot in the bevel gear is open-ended. The bevel gear 28 is supported by the bottom plate 22 directly below the teeth; therefore, there is no binding moment in the web of the bevel gear. Accordingly, the web of the bevel gear is only required to carry torsional loads. A gear housing 32 is detachably connected to the circular plate 22 by means of cap screws 34. The gear housing 32 is provided with an opening having flanged sleeve bearings 36, 36. A pinion 38 is journalled in the bearings 36 and is in meshing engagement with the bevel gear 28. The housing is provided with an oil lubrication fitting 35 to facilitate lubrication of the bearings 36. The housing is also provided with a grease fitting 37 to facilitate greasing the bevel gear 28, and an air vent 39 to prevent any damage from pressure building up inside the housing.

Surrounding the opening in the gear housing 32 is a flange 40 which is provided with bolt holes 42. A motor operator (not shown) may be attached to the flange 40. If a handwheel 41 is to be used to supply the rotative movement, the flange 40 may be eliminated, see Fig. 2. The outer end 44 of the pinion 38 extends outward from the housing and is provided with a keyway slot 46 and threads. If the handwheel 41 is used, the handwheel is slipped over the end 44 and held in nonrotative relation by a key 43 and retained on the pinion by nut 45. If a motor is used, a collar 48 is threaded on the end 44 of the pinion. A driving connection member 50 is inserted in the other end of the collar 48. The member 50 is held secure by a pin 52 and a key 54 which extends into the keyway slot 46 of the pinion 38. The handwheel 41 or collar 48 prevents axial movement of the pinion 38 into the bevel gear 28 which would result in binding the gear 28. Rotation of the pinion 38 by the motor operator or handwheel 41 causes the bevel gear 28 and stem nut 14 to rotate thereby causing axial movement of the nonrotative stem 12.

Extending upward from the center of the housing 32 there is a hollow cylindrical section 56 which acts as a shield for the stem protector-indicator 58 when it is in the retracted position. The stem protector-indicator is similar to that more fully described in copending application S.N. 731,251 filed April 28, 1958, now United States Patent 2,934,036 dated April 26, 1960. Comprising the stem protector-indicator is an extendable bellows 60, bellows cap 62 and bellows cap rod 64. One end of the bellows 60 is secured to the bottom 66 of the cylindrical shield 56. The outer end is attached to the bellows cap 62. The bellows cap rod is attached to the end of the stem 12 and bellows cap 62. Therefore, as the stem 12 extends or retracts, the indicator moves correspondingly—indicating whether the valve is open or closed. To drain any water which may come between the inside wall of the shield 56 and bellows 60 there is a drain 68.

A particular advantage of the present construction is that the bevel gear operator can be completely overhauled while the valve is under pressure. To disassemble the operator, all that is necessary is removal of cap screws 34. After such removal, the housing 32 can be lifted off. The pinion bearings 36 or pinion 38 can be replaced. Also, the bevel gear 28 can be removed and replaced without disturbing the position of the valve. In order to facilitate removal of the bevel gear 28, the outer periphery is provided with a notch 70 so that a removal tool can be inserted beneath the gear 28; therefore, the entire bevel gear operator can be overhauled while the valve is under pressure. If the position of the valve has to be changed before the repairs to the bevel gear operator are completed, a handwheel or wrench can be slipped over the cylindrical section of the stem nut to operate the valve.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. A bevel gear operator for a valve having a bonnet and a rotatively mounted stem nut in the bonnet, the stem nut having a cylindrical section extending above the top of said bonnet, said operator comprising: a base plate having a centrally located opening which telescopes over the cylindrical section of the stem nut, said plate being attached to the top of the bonnet, a bevel gear telescoped over the cylindrical section of the stem nut, means fixing said bevel gear and said stem nut against relative rotation while permitting axial movement of said bevel gear, the bevel gear being supported adjacent its periphery by said plate, a gear housing detachably connected to said plate, a pinion mounted in said housing in meshing engagement with said bevel gear, means attached to said pinion to supply rotative movement, the housing and pinion being removable from said plate while the valve is under pressure.

2. A bevel gear operator for a valve having a bonnet and a stem threaded into a rotatively mounted stem nut in the bonnet, the stem nut having a cylindrical section extending above the top of said bonnet, said operator comprising: a base plate having a centrally located opening which telescopes over the cylindrical section of the stem nut, said plate being attached to the top of the bonnet, a bevel gear telescoped over the cylindrical section of the stem nut, means fixing said bevel gear and said stem nut against relative rotation while permitting axial movement of said bevel gear, said bevel gear being supported by said plate adjacent its periphery, a gear housing detachably connected to said plate, a pinion mounted in said housing in meshing engagement with said bevel gear, means attached to said pinion to supply rotative movement, the housing and pinion being removable from said plate while the valve is under pressure.

3. A bevel gear operator for a valve having a bonnet and a stem threaded into a rotatively mounted stem nut in the bonnet, the stem nut having a cylindrical section extending above the top of said bonnet, said operator comprising: a base plate having a centrally located opening which telescopes over the cylindrical section of the stem nut, said plate being attached to the top of the bonnet, a bevel gear telescoped over the cylindrical section of the stem nut, means fixing said bevel gear and said stem nut against relative rotation while permitting axial movement of said bevel gear, a gear housing detachably connected to said plate, a pinion mounted in said housing in meshing enegagement with said bevel gear, means attached to said pinion to supply rotative movement, the housing and pinion being removable from said plate while the valve is under pressure, the top of the housing being provided with a hollow cylindrical member, an expandable bellows attached to the bottom of said member, the other end of said bellows provided with a cap and a rod attached to the end of the stem and the cap so that as the stem extends or retracts the bellows correspondingly extends and retracts.

4. A bevel gear operator comprising: a mounting plate for attachment to the device to be operated, a bevel gear journalled on a member to be driven, means fixing said bevel gear and said member against relative rotation while permitting axial movement of said bevel gear, a gear housing detachably connected to said plate, a pinion mounted in said housing in meshing engagement with said bevel gear, means attached to said pinion to supply rotative movement, the housing and pinion being removable from said plate without disturbing the driven member.

5. In a valve having a bonnet and a stem threaded into a rotatively mounted stem nut in said bonnet, said stem nut having a cylindrical section extending above the top of said bonnet, a base plate having a centrally located opening which fits over said stem nut attached to the top of said bonnet, a bevel gear journalled on the cylindrical section of said stem nut, means fixing said bevel gear and said stem nut against relative rotation while permitting axial movement of said bevel gear, the gear being supported adjacent its periphery by the base plate, a gear housing detachably connected to said plate, a pinion mounted in said housing in meshing engagement with said bevel gear.

6. A bevel gear operated valve comprising a valve bonnet having an axial bore and a counterbore at the axial outer end of said bonnet aligned with said bore thereby forming an annular shoulder, a valve stem in said bore, the axial outer end of said valve stem provided with threads, a stem nut having a cylindrical portion extending axially outward of said bonnet and having a central passage provided with threads, said nut being in threaded engagement with the threads of said stem, said stem nut having an external annular flange located in said counterbore, a bearing between the shoulder in said bonnet and the annular flange of the stem nut, a second bearing axially outward of said annular flange, a base plate having a centrally located opening telescoped over the axially outward extending cylindrical section of the stem nut, said plate attached to the top of the bonnet restraining axial outward movement of said stem nut, a bevel gear telescoped over the cylindrical section of the stem nut, means fixing said bevel gear and said stem nut against relative rotation while permitting axial movement of said bevel gear, the bevel gear being supported adjacent its periphery by said plate, a gear housing detachably connected to said plate, a pinion mounted in said housing in meshing engagement with said bevel gear, means attached to said pinion to supply rotative movement, the housing and pinion being removable from said plate while the valve is under pressure.

7. A bevel gear operated valve comprising a valve bonnet having an axial bore and a counterbore at the axial outer end of said bonnet aligned with said bore thereby forming an annular shoulder, a valve stem in said bore, the axial outer end of said valve stem provided with threads, a stem nut having a cylindrical portion extending axially outward of said bonnet and having a central passage provided with threads, said nut being in threaded engagement with the threads of said stem, said stem nut having an external annular flange located in said counterbore, a bearing between the shoulder in said bonnet and the annular flange of the stem nut, a second bearing axially outward of said annular flange, a base plate having a centrally located opening telescoped over the axially outward extending cylindrical section of the stem nut, said plate attached to the top of the bonnet restraining axial outward movement of said stem nut, a bevel gear telescoped over the cylindrical section of the stem nut, means fixing said bevel gear and said stem nut against relative rotation while permitting axial movement of said bevel gear, a gear housing detachably connected to said plate, a pinion mounted in said housing in meshing engagement with said bevel gear, means attached to said pinion to supply rotative movement.

8. A bevel gear operator for a valve having a bonnet and a rotatively mounted stem nut in the bonnet, the stem nut having a cylindrical section extending above the top of said bonnet, said operator comprising: a base plate having a centrally located opening which telescopes over the cylindrical section of the stem nut, said plate being attached to the top of the bonnet, a bevel gear telescoped over the cylindrical section of the stem nut, means fixing said bevel gear and said stem nut against relative rotation while permitting axial movement of said bevel gear, the bevel gear being supported adjacent its periphery by said plate, a generally hemispherical gear housing having an edge corresponding to the periphery of said base plate, means to detachably connect said housing to said base plate, said gear housing having a radially extending boss, a passage through said boss, a flanged sleeve bearing extending into said passage from inside said housing, a second flanged sleeve bearing extending into said passage from the outside of said housing, the opposing ends of said bearings not touching, a pinion having a shaft attached thereto, said shaft journalled in said bearings, means in said boss to provide lubrication to the journalled shaft, the outer end of said shaft provided with threads, a collar having internal threads threaded on the end of said shaft retaining the pinion in position, means to rotate said shaft, said pinion in meshing engagement with said bevel gear, said housing being removable from said base plate without moving said bevel gear.

9. A bevel gear operator for a valve having a bonnet and a rotatively mounted stem nut in the bonnet, the stem nut having a cylindrical section extending above the top of said bonnet, said operator comprising: a base plate having a centrally located opening which telescopes over the cylindrical section of the stem nut, said plate being attached to the top of the bonnet, a bevel gear telescoped over the cylindrical section of the stem nut, means fixing said bevel gear and said stem nut against relative rotation while permitting axial movement of said bevel gear, the bevel gear being supported adjacent its periphery by said plate, a generally hemispherical gear housing having an edge corresponding to the periphery of said base plate, means to detachably connect said housing to said base plate, said gear housing having a radially extending boss, a passage through said boss, a sleeve bearing in said passage, a pinion having a shaft attached thereto, said shaft journalled in said bearing, means to rotate said shaft and retain said pinion in said bearing, said pinion being in meshing engagement with said bevel gear, said housing being removable from said base plate without moving said bevel gear.

10. The bevel gear operator specified in claim 9 characterized in that the housing is provided with means to lubricate said bevel gear and pinion.

11. The bevel gear operator specified in claim 9 characterized in that the housing is provided with an air vent to prevent pressure from building up inside the housing.

12. The bevel gear operator specified in claim 9 in which the bevel gear is provided with a notch in the surface opposing the base plate to facilitate removal of said bevel gear.

References Cited in the file of this patent
UNITED STATES PATENTS

| | | |
|---|---|---|
| 1,943,854 | Beckwith | Jan. 16, 1934 |
| 2,317,529 | Hodgson et al. | Apr. 27, 1943 |
| 2,444,703 | Jones | July 6, 1948 |
| 2,496,740 | Morey | Feb. 7, 1950 |
| 2,567,035 | Setka | Sept. 4, 1951 |
| 2,674,903 | Doster | Apr. 13, 1954 |
| 2,845,814 | Milleville | Aug. 5, 1958 |